United States Patent Office 3,551,429
Patented Dec. 29, 1970

3,551,429
1-(α,α - DIMETHYL - β - ACETOXYPROPIONYL)-3 - ISOPROPYL - 2,4 - DIOXODECAHYDRO-QUINAZOLINE
Adolf Zeidler, Ludwigshafen (Rhine), Adolf Fischer, Mutterstadt, Pfalz, and Gert Buerger and Franz Merger, Ludwigshafen (Rhine), Germany, assignors to Badische Anilin- & Soda-Fabrik Aktiengesellschaft, Ludwigshafen (Rhine), Germany,
No Drawing. Filed Mar. 27, 1968, Ser. No. 716,294
Claims priority, application Germany, Apr. 7, 1967, B 91,956
Int. Cl. C07d 51/48
U.S. Cl. 260—260                    1 Claim

ABSTRACT OF THE DISCLOSURE

1 - (α,α-dimethyl-β-acetoxypropionyl)-3-isopropyl-2,4-dioxodecahydroquinazoline, said compound being useful as a herbicide.

---

The present invention relates to valuable new substituted 2,4-dioxodecahydroquinazolines, in particular those which are substituted in the 1-position by an acid radical and in the 3-position by an alkyl radical. The invention also relates to a method of controlling unwanted plant growth with said compounds.

It is known that the potassium salt of 2-methyl-4-chlorophenoxyacetic acid may be used as a herbicide. However its action is not satisfactory.

An object of the present invention is to provide valuable new substituted 2,4-dioxodecahydroquinazolines. Another object of the invention is to provide a method of controlling unwanted plants with said compounds especially in crops without injuring the crop plants.

These and other objects of the invention are achieved with herbicides which contain a 2,4-dioxodecahydroquinazoline having the formula

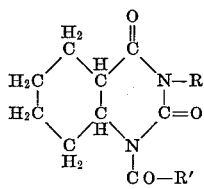

in which R denotes an alkyl group having 2 to 4 carbon atoms and R' denotes an alkyl radical which is substituted by fluorine, bromine, iodine, or a benzoyloxy group, or an acyloxy group which may be substituted.

The following 2,4-dioxodecahydroquinazolines are examples of the active ingredients to be used according to the invention:

1-(α,α-dimethyl-β-bromopropionyl)-,
1-(α,α-dimethyl-β-iodopropionyl)-,
1-(α,α-dimethyl-β-acetoxypropionyl)-,
1-(α,α-dimethyl-β-propionyloxypropionyl)-,
1-(α,α-dimethyl-β-isobutyryloxypropionyl)-,
1-(α,α-dimethyl-β-pivaloyloxypropionyl)-,
1-(α,α-dimethyl-β-benzoyloxypropionyl)-,
1-(α,α-dimethyl-β-[2',4'-dichlorophenoxy-α'-propionyloxy]-propionyl)-, 1-(α,α-dimethyl-β-[2-methyl-4-chlorophenoxyacetaloxy]-propionyl)-,
1-(α,α-dimethyl-β-[α'-methylbutyryloxy]-propionyl)-,
1-(α,α-dimethyl-β-crotonyloxypropionyl)-,
1-(α,α-dimethyl-β-acetoxypivaloyloxypropionyl)- and
1-(α,α-dimethyl-β-[2',4'-dichlorobenxoyloxy]-propionyl)-3-isopropyl-2,4-dioxodecahydroquinazoline,
1-(α,α-dimethyl-β-acetoxypropionyl)-,
1-(α,α-dimethyl-β-(2',4'-dichlorobenzoyloxypropionyl)-,
1-(α,α-dimethyl-β-bromopropionyl)-,
1-(α,α-dimethyl-β-[α'-methylbutyryloxy]-propionyl)-,
1-(α,α-dimethyl-β-pivaloyloxypropionyl)- and
1-(α,α-dimethyl-β-crotonyloxypropionyl)-3-s-butyl-2,4-dioxodecahydroquinazoline,
1-(α,α-dimethyl-β-crotonyloxypropionyl)-,
1-(α,α-dimethyl-β-bromopropionyl)-,
1-(α,α-dimethyl-β-acetoxypropionyl)-,
1-(α,α-dimethyl-β-[α'-methylbutyryloxy]-propionyl)- and
1-(α,α-dimethyl-β-acetoxypivaloyloxypropionyl)-3-isobutyl-2,4-dioxodecahydroquinazoline.

The new active ingredients may be synthesized according to the following equation by acylating a 3-alkyl-2,4-dioxodecahydroquinazoline with a suitable carbonyl halide, preferably a carbonyl chloride, in the presence of an acid acceptor.

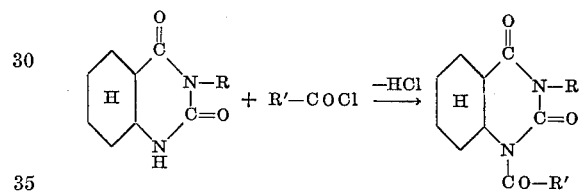

R and R' have the meanings given above.

Since all of the compounds to be used according to the invention can be prepared by the same method, the preparation of 1-(α,α-dimethyl-β-acetoxypropionyl)-3-isopropyl-2,4-dioxodecahydroquinazoline is described in detail below. 21 parts (by weight) of 3-isopropyl-2,4-dioxodecahydroquinazoline is dissolved in a mixture of 300 parts of toluene and 40 parts of triethylamine. 26.8 parts of α,α-dimethyl-β-acetoxypropionyl chloride is dripped into the resulting solution. To complete the reaction the mixture is stirred for 8 hours at 80° C., and the triethylamine hydrochloride formed is suction filtered. The filtrate is washed neutral with water, dried with anhydrous sodium sulfate and evaporated in the vacuum of a water jet pump. 35 parts of a crystalline residue is obtained which is purified by recrystallization from methanol. The pure product thus obtained melts at 118° C.

The new active compounds are colorless crystalline substances or viscous oils which are very stable chemically and thermally.

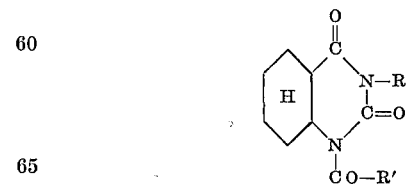

Examples of the new active ingredients are listed in the table below:

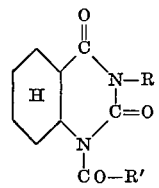

| R | —CO—R' | M.P., °C |
|---|--------|----------|
| CH₃\CH—/CH₃ | —CO—C(CH₃)₂—CH₂Br | 70 |
| Same as above | —CO—C(CH₃)₂—CH₂I | 79 |
| Do | —CO—C(CH₃)₂—CH₂—O—CO—C₂H₅ | 94 |
| Do | —CO—C(CH₃)₂—CH₂—O—CO—CH(CH₃)—C₂H₅ | 46 |
| Do | —CO—C(CH₃)₂—CH₂—O—CO—C(CH₃)₂—CH₃ | 76 |
| Do | —CO—C(CH₃)₂—CH₂—O—CO—CH=CH—CH₃ | 83 |
| Do | —CO—C(CH₃)₂—CH₂—O—CO—C(CH₃)₂—CH₂—O—COCH₃ | (¹) |
| Do | —CO—C(CH₃)₂—CH₂—O—CO—C₆H₃Cl₂ | 110 |
| Do | —CO—C(CH₃)₂—CH₂—O—CO—CH₃ | 116-118 |
| Do | —CO—C(CH₃)₂—CH₂—O—CO—CH(CH₃)—O—C₆H₃Cl₂ | (¹) |
| CH₃\CH—CH₂—/CH₃ | —CO—C(CH₃)₂—CH₂Br | 72 |
| Same as above | —CO—C(CH₃)₂—CH₂—O—CO—CH(CH₃)—C₂H₅ | 48 |
| Do | —CO—C(CH₃)₂—CH₂—O—CO—CH=CH—CH₃ | (²) |
| Do | —CO—C(CH₃)₂—CH₂—O—CO—C(CH₃)₂—CH₂—O—COCH₃ | 70 |
| C₂H₅\CH—/CH₃ | —CO—C(CH₃)₂—CH₂—Br | (³) |

| R | —CO—R' | M.P., °C |
|---|---|---|
| $\mathrm{C_2H_5}\!\!>\!\!\mathrm{CH-}$ / $\mathrm{CH_3}$ | —CO—CH₃ ‖ C—CH₂—O—CO—CH₃ ‖ CH₃ | 74 |
| Do | —CO—C(CH₃)—CH₂—O—CO—CH—C₂H₅ \| \| CH₃ CH₃ | (¹) |
| $\mathrm{CH_3}\!\!>\!\!\mathrm{CH-CH_2-}$ / $\mathrm{CH_3}$ | —CO—C(CH₃)—CH₂—O—CO—CH₃ \| CH₃ | 97 |
| $\mathrm{C_2H_5}\!\!>\!\!\mathrm{CH-}$ / $\mathrm{CH_3}$ | —CO—C(CH₃)—CH₂—O—CO—C(CH₃)—CH₃ \| \| CH₃ CH₃ | 73 |
| Same as above | —CO—C(CH₃)—CH₂—O—CO—CH=CH—CH₃ \| CH₃ | (⁵) |

¹ Viscous yellow oil.
² Yellow oil.
³ B.P.₀.₃=164° C.
⁴ B.P.₀.₂=177° C.
⁵ Pale yellow oil.

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The following examples illustrate the application of the agents according to the invention.

EXAMPLE 1

In a greenhouse, soil sown with seeds of Indian corn (*Zea mays*), potatoes (*Solanum tuberosum*), wild mustard (*Sinapis arvensis*), white goosefoot (*Chenopodium album*), common chickweed (*Stellaria media*), small nettle (*Urtica urens*), garden sorrel (*Rumex acetosa*) annual meadow grass (*Poa annua*) and barnyard grass (*Panicum crus galli*) was treated with 1-(α,α-dimethyl-β-acetoxypropionyl)-3-isopropyl - 2,4-dioxodecahydroquinazoline (I) and 1 - (α,α-dimethyl-β-bromopropionyl)-3-isopropyl-2,4-dioxodecahydroquinazoline (II) each at the rate of 1.5 kg. of active ingredient per hectare dispersed in 500 liters of water.

It was observed after 3 to 4 weeks that the weeds, wild mustard, white goosefoot, common chickweed, small nettle, garden sorrel, annual meadow grass and barnyard grass had almost completely been killed whereas the Indian corn and potatoes were growing normally and showed no signs of injury.

The following have the same biological action as active ingredients I and II:

1-(α,α-dimethyl-β-iodopropionyl)-3-isopropyl-2,4-dioxodecahydroquinazoline 1-(α,α-dimethyl-β-propionyloxypropionyl)-3-isopropyl-2,4-dioxodecahydroquinazoline 1-(α,α-dimethyl-β-isobutyryloxypropionyl)-3-isopropyl-2,4-dioxodecahydroquinazoline 1-(α,α-dimthyl-β-[2′,4′-dichlorophenoxyacetyloxy]-propionyl)-3-s-butyl-2,4-dioxodecahydroquinazoline 1-(α,α-dimethyl-β-acetoxypropionyl)-3-s-butyl-2,4-dioxodecahydroquinazoline 1-(α,α-dimethyl-β-chrotonyloxypropionyl)-3-isobutyl-2,4-dioxodecahydroquinazoline 1-(α,α-dimethyl-β-[α-methylbutyryloxy]-propionyl)-3-isopropyl-2,4-dioxodecahydroquinazoline 1-(α,α-dimethyl-β-pivaloyloxypropionyl)-3-isopropyl-2,4-dioxodecahydroquinazoline 1-(α,α-dimethyl-β-[acetoxypivaloyloxy]-propionyl)-3-isopropyl-2,4-dioxodecahydroquinazoline 1-(α,α-dimethyl-β-bromopropionyl)-3-isobutyl-2,4-dioxodecahydroquinazoline 1-(α,α-dimethyl-β-[acetoxypivaloyloxy]-propionyl)-3-isobutyl-2,4-dioxodecahydroquinazoline 1-(α,α-dimethyl-β-crotonyloxypropionyl)-3-s-butyl-2,4-dioxodecahydroquinazoline 1-(αα-dimethyl-β-[α-methylbutyryloxy]-propionyl)-

1-(α,α-dimethyl-β-[α-methylbutyryloxy]-propionyl)-3-s-butyl-2,4-dioxodecahydroquinazoline 1-(α,α-dimethyl-β-pivaloyloxypropionyl)-3-s-butyl-2,4-dioxodecahydroquinazoline

EXAMPLE 2

In a greenhouse the plants barley (*Hordeum vulgare*), Indian corn (*Zea mays*), potatoes (*Solanum tuberosum*) white goosefoot (*Chenopodium album*), small nettle (*Urtica urens*), wild mustard (*Sinapis arvensis*), common chickweed (*Stellaria media*), garden sorrel (*Rumex acetosa*) annual meadow grass (*Poa annua*) and barnyard grass (*Panicum crus galli*) were treated at a growth height of 5 to 10 cm. with 1 - (α,α - dimethyl-β-acetoxypropyl)-3-isopropyl - 2,4-dioxodecahydroquinazoine (I), 1-(α,α-dimethyl-β-bromopropionyl)-3-isopropyl - 2,4 - dioxodecahydroquinazoline (II), 1-(α,α-dimethyl-β - iodopropionyl)-3-isopropyl-2,4 - dioxodecahydroquinazoline (III) and, for comparison, with the known sodium salt of 2-methyl-4-chlorophenoxyacetic acid (IV), each at a rate of 1.5 kg. of active ingredient per hectare dissolved or dispersed in 500 liters of water. After 3 to 4 weeks the results given in the following table were observed.

| | Active ingredient | | | |
|---|---|---|---|---|
| | I | II | III | IV |
| Crop plants: | | | | |
| Barley | 10 | 10-20 | 10 | 10 |
| Indian corn | 10 | 0 | 0 | 30 |
| Potatoes | 10 | 0-10 | 0 | 20 |
| Unwanted plants: | | | | |
| White goosefoot | 90-100 | 90-100 | 100 | 90-100 |
| Small nettle | 90-100 | 100 | 100 | 90 |
| Wild mustard | 90-100 | 90-100 | 100 | 90-100 |
| Common chickweed | 80-90 | 80-90 | 90-100 | 20 |
| Garden sorrel | 80-90 | 90 | 90-100 | 70 |
| Annual meadow grass | 80-90 | 90-100 | 90-100 | 0-10 |
| Barnyard grass | 80 | 90-100 | 90-100 | 0 |

Note:
0=no action.
100=complete kill.

The following have the same biological action as I, II and III:

1-($\alpha,\alpha$-dimethyl - $\beta$ - [2' - methyl - 4' - chlorophenoxy-$\alpha'$-propionyloxy]-propionyl)-3-isopropyl - 2,4-dioxodecahydroquinazoline 1 - ($\alpha,\alpha$ - dimethyl - $\beta$-[$\omega'$-chlorocaproyloxy]-propionyl)-3-isopropyl-2,4-dioxodecahydroquinazoline The agents according to the invention may also be used as total herbicides when applied at higher rates.

We claim:
1. 1 - ($\alpha,\alpha$ - dimethyl - $\beta$ - acetoxypropionyl) - 3-isopropyl-2-2,4-dioxodecahydroquinazoline.

References Cited

UNITED STATES PATENTS

| 3,235,363 | 2/1966 | Luckenbaugh et al. | 260—260 |
| 3,322,526 | 5/1967 | Loux | 260—260 |
| 3,360,520 | 12/1967 | Luckenbaugh et al. | 260—260 |
| 3,360,523 | 12/1967 | Loux | 260—260 |

ALEX MAZEL, Primary Examiner

A. T. TIGHE, Assistant Examiner

U.S. Cl. X.R.

71—92; 260—476, 483, 544

PO-1050
(5/69)

UNITED STATES PATENT OFFICE
CERTIFICATE OF CORRECTION

Patent No. 3,551,429           Dated December 29, 1970

Inventor(s) Adolf Zeidler et al

It is certified that error appears in the above-identified patent and that said Letters Patent are hereby corrected as shown below:

Column 2, lines 58-66, delete the entire formula.

Column 3, last line, in the table, under "R",
"$\begin{array}{c}C_2H_5\\ \phantom{C_2H_5}\diagdown\\ \phantom{C_2H_5}\phantom{\diagdown}CH-\\ CH\diagup\end{array}$ " should read -- $\begin{array}{c}C_2H_5\\ \phantom{C_2H_5}\diagdown\\ \phantom{C_2H_5}\phantom{\diagdown}CH-\\ CH_3\diagup\end{array}$ --.

Column 5, in the table, first line, under "-CO-R'",
"$\begin{array}{c}\text{-CO-CH}_3\\ |\\ \text{C-CH}_2\text{-O-CO-CH}_3\\ |\\ \text{CH}_3\end{array}$ " should read -- $\begin{array}{c}\text{CH}_3\\ |\\ \text{-CO-C-CH}_2\text{-O-CO-CH}_3\\ |\\ \text{CH}_3\end{array}$ --.

Column 6, line 34, "dimthyl" should read -- dimethyl --; line "chrotonyloxypropionyl" should read -- crotonyloxypropionyl -- line 51, delete the entire line.

Signed and sealed this 18th day of May 1971.

(SEAL)
Attest:

EDWARD M. FLETCHER, JR.
Attesting Officer

WILLIAM E. SCHUYLER, JR.
Commissioner of Patents